(12) United States Patent
Ceesay

(10) Patent No.: US 12,297,802 B2
(45) Date of Patent: May 13, 2025

(54) VERTICAL AXIS WIND TURBINE SYSTEM FOR TRANSPORTATION VEHICLES

(71) Applicant: Kaab Ceesay, Bronx, NY (US)

(72) Inventor: Kaab Ceesay, Bronx, NY (US)

(73) Assignee: Kaab Ceesay, Bronx, NY (US)

( * ) Notice: Subject to any disclaimer, the term of this patent is extended or adjusted under 35 U.S.C. 154(b) by 23 days.

(21) Appl. No.: 18/209,772

(22) Filed: Jun. 14, 2023

(65) Prior Publication Data

US 2024/0418153 A1 Dec. 19, 2024

(51) Int. Cl.
| | |
|---|---|
| *F03D 9/32* | (2016.01) |
| *F03D 3/00* | (2006.01) |
| *F03D 3/04* | (2006.01) |
| *F03D 13/20* | (2016.01) |

(52) U.S. Cl.
CPC ............ *F03D 13/20* (2016.05); *F03D 3/005* (2013.01); *F03D 3/0445* (2013.01); *F05B 2240/13* (2013.01); *F05B 2240/941* (2013.01)

(58) Field of Classification Search
None
See application file for complete search history.

(56) References Cited

U.S. PATENT DOCUMENTS

| | | | |
|---|---|---|---|
| 7,147,069 B2 * | 12/2006 | Maberry | F03D 9/32 |
| | | | 180/2.2 |
| 8,240,416 B2 * | 8/2012 | Cong | F03D 9/17 |
| | | | 180/2.2 |
| 10,358,038 B1 * | 7/2019 | Ripley | H02K 7/183 |
| 2009/0314567 A1 * | 12/2009 | Harrington | F03D 9/11 |
| | | | 903/902 |
| 2012/0187685 A1 * | 7/2012 | Amin | F03D 3/0445 |
| | | | 290/50 |

FOREIGN PATENT DOCUMENTS

GB 2434703 A * 8/2007 ............ B60K 16/00

* cited by examiner

*Primary Examiner* — Kayla Mccaffrey

(57) ABSTRACT

A vertical axis wind turbine system for charging transportation vehicles while the vehicles are in operation. The system comprising at least one vertical axis wind turbine comprising a plurality of blades and a shield located upstream of the at least one vertical axis wind turbine. The shield partially overlaps the at least one vertical axis wind turbine in a horizontal direction such that only open facing blades of the plurality of blades are exposed to a wind. The system is mounted above, inside of or in front of the transportation vehicle.

5 Claims, 6 Drawing Sheets

Figure 8:
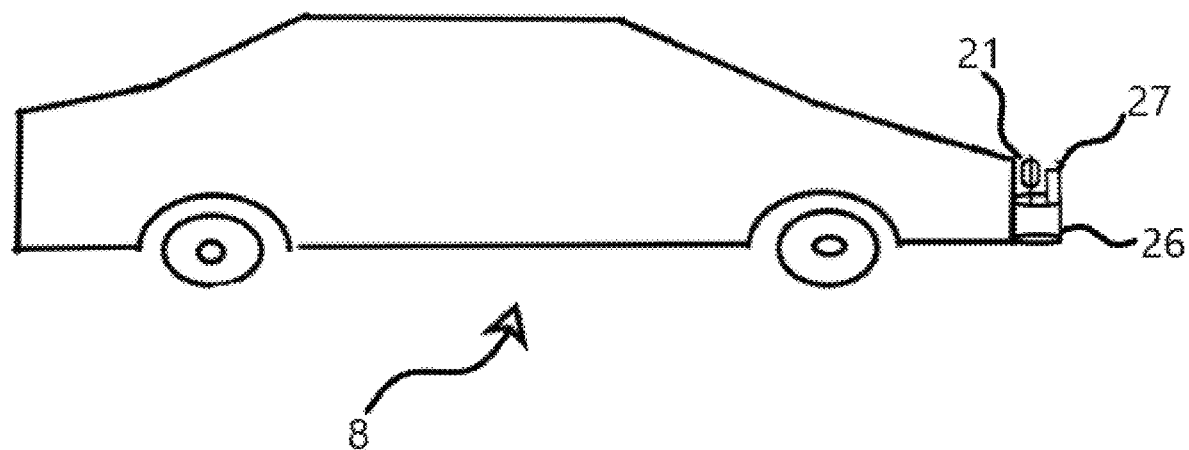

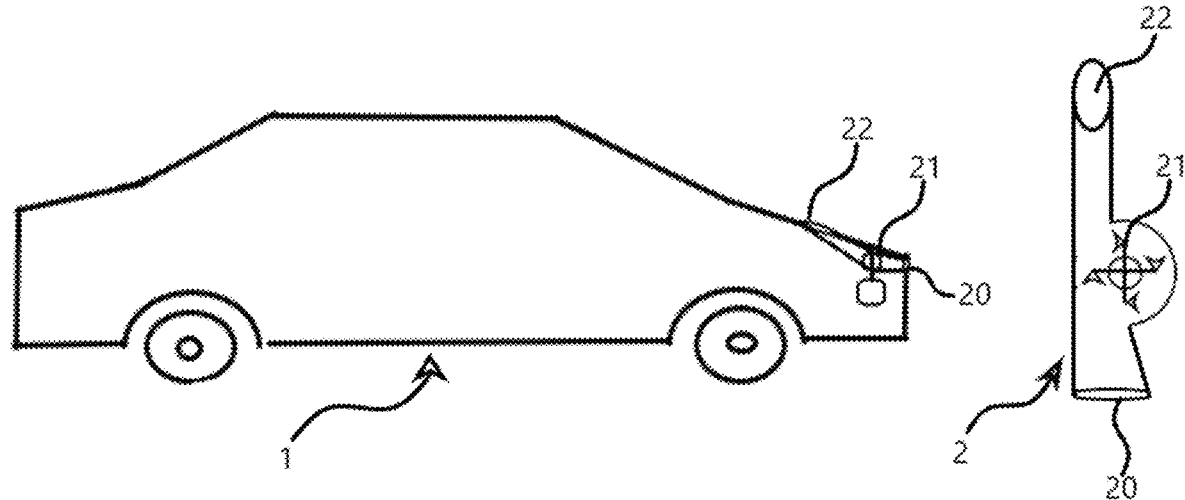
Fig 1:
Fig 2:
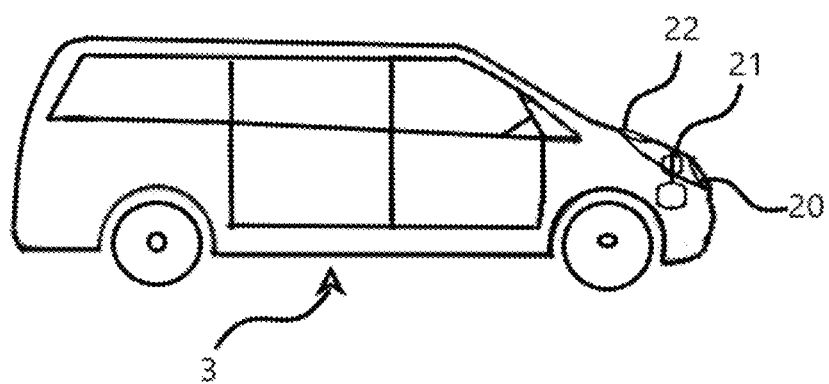
Fig 3:

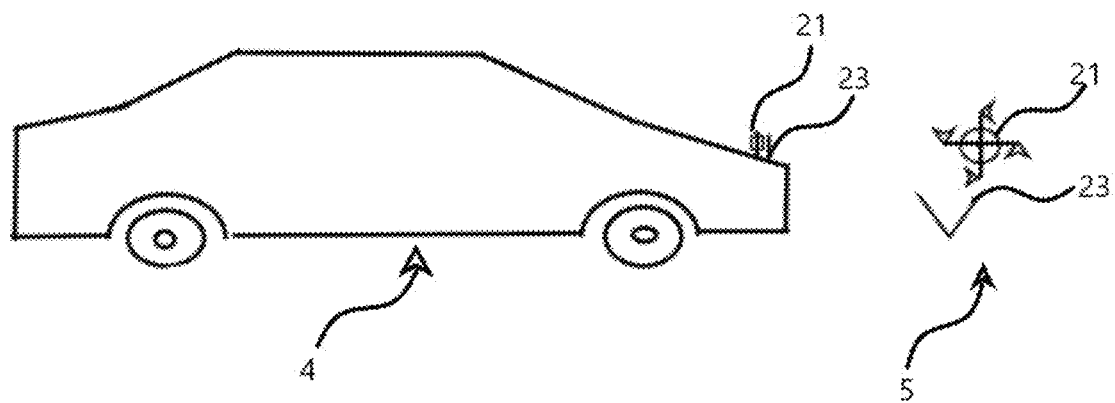
Fig 4:　　　　　　　　　　　　Fig 5:
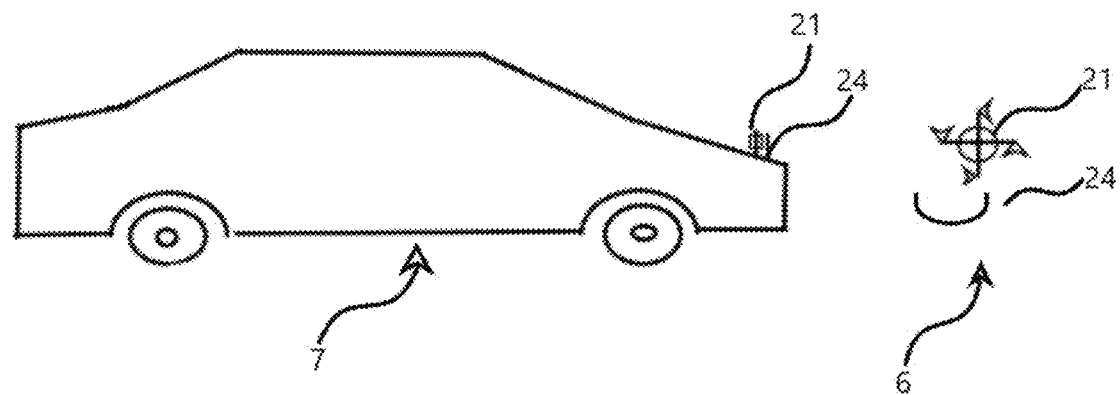
Fig 7:　　　　　　　　　　　　FIG 6:

VERTICAL AXIS WIND TURBINE SYSTEM FOR TRANSPORTATION VEHICLES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

DESCRIPTION

Technical Field of the Invention

This innovation is related to vertical axis wind turbines, specifically the method in which the wind turbine can effectively be attached to an Electric Vehicles (EVs) for efficient use and charge the Vehicle while driving. Which I discovered while I was trying out different methods to attach my earlier invention, the multiple folded blade vertical axis wind turbine to vehicles to see which method will be the most effective and efficient way to attach vertical axis wind turbines to Electric Vehicles to charge it while driving. I find that partial shielding the side of a vertical axis wind turbine where the blade is not facing the wind and only allowing the wind to interact with the blade opening facing the wind is the most efficient way to attach vertical axis wind turbines to EVs and use the turbine to charge the car while driving. This reduces drag of the returning blades by diverting or partial shielding it from high wind. This method is most efficient because we know the direction of wind, so we know where to position the partial shield which is normally on the In front of the turbine between the turbine and the wind. This partial shield can also force some wind into the blade open facing the wind. The wind pushes the blades open facing the wind causing the turbine to spin efficiently. However, due to the partial shield the blades not facing the wind will not experience any wind pushing against it, reducing the blade drag because it's shield from the wind.

Background of the Invention

A vertical axis wind turbine power generating system has been around for many decades now and many designs, each calming supremacy. However many engineers and researchers are still trying to find a proper way to attach vertical axis wind turbines to Electric Vehicles for efficient and effective day to day use. This method provides a solution to the problem, as global demand for both Electric Vehicles and wind energy has increased. As well as many investors and Electric Vehicles Manufacturers are still trying to find the right method or way to bait on. This partial shielding method focuses on efficiency by further reducing the drag of the blade not facing the direction of the wind. The partial shield method will also allow for this increase in efficiency and effectiveness. By making it easy for the blades not facing the front or direction of the wind to not experience large wind pushing against the blade, while it rotates. The wind is the source of the drag. The partial shield reduces the amount and the speed of wind in contact with the blades not facing the wind direction. While the blade open facing the direction of the wind is allowed to have maximum contact and exposure to wind pushing against it. This combined process will increase the turbine angular rotation speed as well as require less wind to spin the turbine. Since the opposite blade is not experiencing any drag. This method will generate a usable amount of energy to charge the Vehicle while driving. Basically giving the driver the control of their EV energy needs, reduce energy cost and save them time spent at the charging stations.

Existing art: A vertical axis wind turbine attached to Electric Vehicles is coupled with many different parts. Such as the wind turbine, blades, Joints, bearings, rods, pins, partial shield, welded parts, coil windings, nuts, bolts and how the wind turbine is connected to the electric vehicles will use the same techniques that have been around for many hundreds of years. My method is different because of the way it puts different parts like the wind turbine and the partial shield together to bring about better efficiency and effective use of vertical axis wind turbines attach to electric vehicles because we know the direction of the wind. The partially shielding a part of a vertical axis wind turbine when attaching it to EVs method however is relatively new. I am not aware of any design that uses this technique to the best of my knowledge.

Current art: List of the disadvantages of the current art:
1) In ability to generate enough power to charge EVs
2) Expensive to build and operate
3) Expensive to research
4) Cause too much drag for EVs
5) Not reliable and takes too much space
6) Mounting methods are not able to capture the maximum amount of wind and utilized
7) Mounting methods are not designed to increase efficiency and reduce drag.
8) Most researchs focused on horizontal axis wind turbines.

BRIEF SUMMARY OF THE INVENTION

The purpose of this attaching method is to bring Electric Vehicles energy needs into the control of the driver/user, to make the EVs grid free and Climate friendly. Also to eliminate the need for new charging stations and long wait time at the charging stations etc. This method is suitable for small and compact vertical axis wind turbines. So the turbine will be efficient and effective without taking too much space, and still allow the car to be a car. The method is able to achieve this claim because of the unique positioning of the partial shield, which is positioned In front and slightly to one side of the vertical axis wind turbine between the wind turbine and the wind. Only allowing the blades facing the wind to experience the full effect of the wind. This is good because there will be no wind pushing against the opposite blades, causing the turbine to spin faster. The blade that is facing away from the direction of the wind drag is reduced, because the blade is shield, allowing the blades to experience little to no wind. The purpose of the shield is to keep the blade not facing the wind from experiencing the full effect of the wind to reduce drag and increased efficiency. The bottom half is the turbine is not exposed to any wind because it does not contribute to efficiency and effectiveness of the method in generating electricity. The uniqueness of the method is the addition of the partial shield which is positioned in front and slightly to one side of the turbine to make the turbine efficient in generating electricity to charge the Electric Vehicles while driving.

BRIEF DESCRIPTION OF THE SEVERAL VIEWS OF THE DRAWING(S)

Note: For simplicity of the illustration vehicle details, turbine details, nuts, bolts, welded areas, glued and attached area's are not depicted as they are known to those who are skilled in this art. When they are shown is purely for illustration purposes, and not intended to capture all embodiments of the invention disclosed.

FIG. 1. Is a complete side view of the entire method of the generating and charging system when the vertical axis wind turbine is operating on the inside of the hood of a car. It shows the opening for air intake, the vertical axis wind turbine and the exit opening for the air to escape on the top section.

FIG. 2. Is a complete top view of the entire method of the generating and charging system. It shows the opening for air intake, the partial shield, the vertical axis wind turbine which is the circle, the cross and the open triangle, and the opening behind it for the air to exit through the top.

FIG. 3. Is a complete side view of the entire method of the generating and charging system when the vertical axis wind turbine is operating on the inside the hood of a different car. It shows the opening for air intake, the vertical axis wind turbine and the exit opening for the air to escape on the top section.

FIG. 4. The complete side view of the entire method of the generating and charging system when the vertical axis wind turbine is operating above the hood of the car. It shows the vertical axis wind turbine as a rectangle with a vertical line in the middle and the partial shield as just a vertical line.

FIG. 5. The figure shows a close in top view of the entire method of the generating and charging system when the vertical axis wind turbine is operating above the hood of the vehicle. It shows the partial shield as an open triangle and the vertical axis wind turbine as a circle with cross and open triangle on the sides attached to the cross.

FIG. 6. The figure shows a close in top view of the entire method of the generating and charging system when the vertical axis wind turbine is operating above the hood of the vehicle. It shows a different partial shield in the form of a semicircle and the vertical axis wind turbine as a circle with cross and open triangle on the sides attached to the cross.

FIG. 7. The complete side view of the entire method of the generating and charging system when the vertical axis wind turbine is operating above the hood of the car. It shows the vertical axis wind turbine as a rectangle with a vertical line in the middle and the partial shield as just a vertical line.

FIG. 8. The complete side view of the entire method of the generating and charging system when the vertical axis wind turbine is operating in front of the hood of the car. It shows the vertical axis wind turbine, the partial shield and the housing tube.

Figure 9:
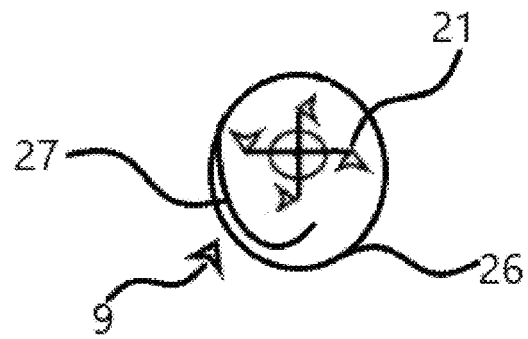

FIG. 9. The close in top view of the vertical axis wind turbine as a circle with cross and open triangle on the sides, the partial shield as semicircle and the housing tube as a circle, when the vertical axis wind turbine is operating in front of the hood of the vehicle.

Figure 10:
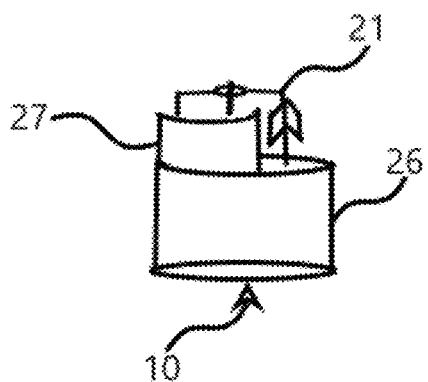

FIG. 10. The close in front view of the vertical axis wind turbine, the partial shield and housing tube, when the vertical axis wind turbine is operating in front of the hood.

Figure 11:
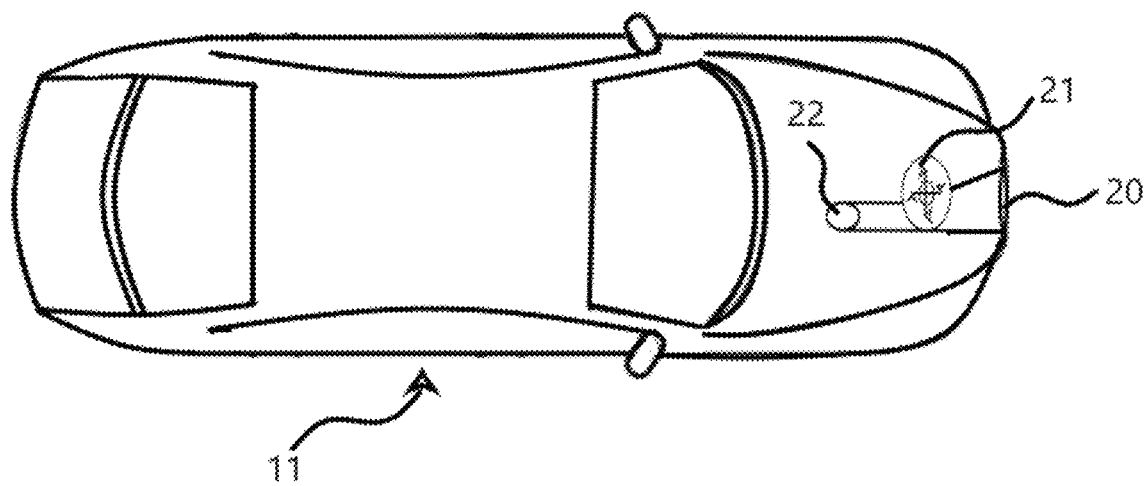

FIG. 11. The complete top view of the operating method on a vehicle, when the vertical axis wind turbine is operating inside the hood. It shows the opening for air intake, the turbine and the exit opening for air to escape out of.

Figure 12:
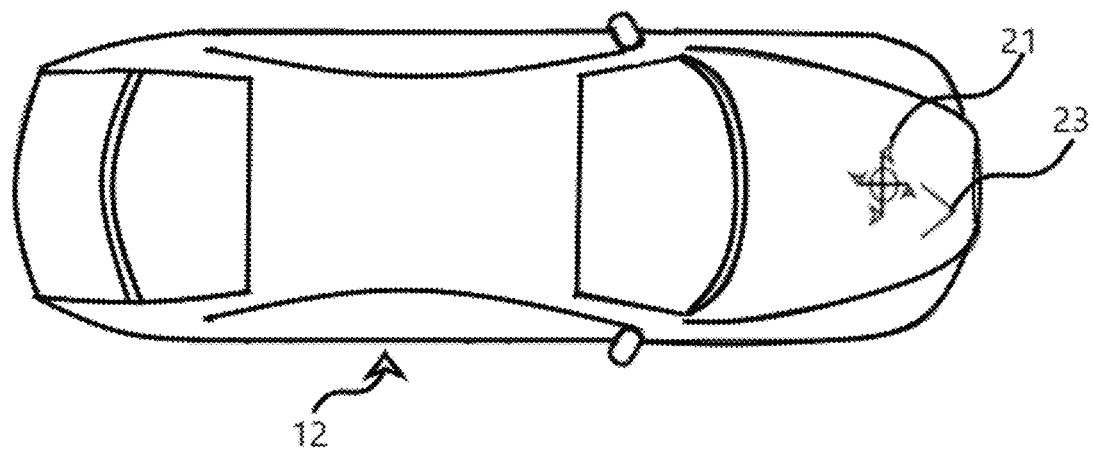

FIG. 12. The complete top view of the operating system on a vehicle, when the vertical axis wind turbine system is operating above the hood. It shows the wind turbine and the partial shield as an open triangle.

Figure 13:
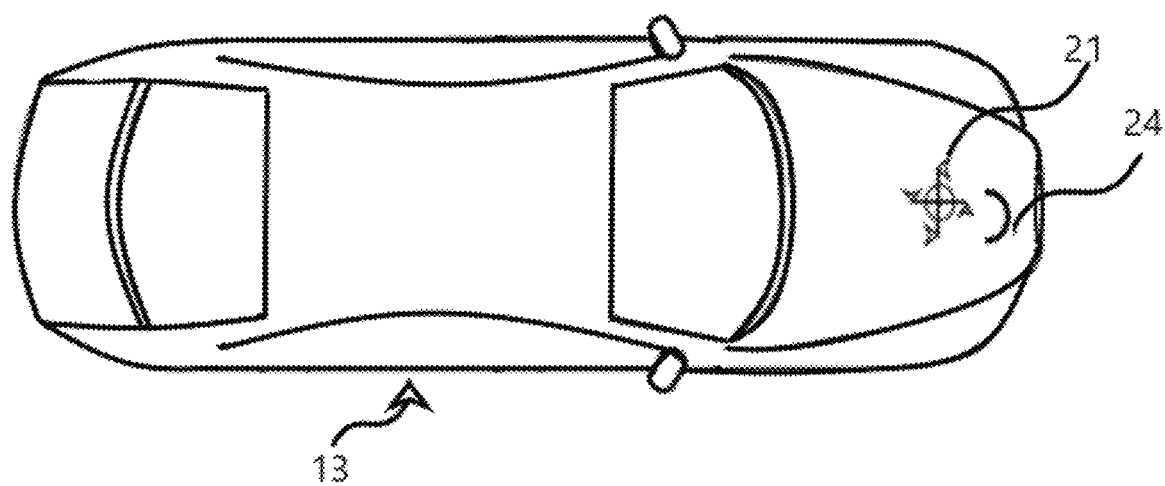

FIG. 13. The complete top view of the operating system on a vehicle, when operating above the hood. It shows the wind turbine and a different partial shield as a semicircle.

DETAILED DESCRIPTION OF THE INVENTION

The various embodiment variations therefore illustrated in the accompanying Figures and/or described herein merely exemplary and are not meant to limit the scope of the invention. It is to be appreciated that numerous variations of the invention have been contemplated as would be obvious to one of ordinary skills in the art with the benefits of this disclosure. Rather, the scope and breadth of afforded this document should only be limited by the claim provided herein while applying either the plain meaning of each the terms and phrases in the claim or the meaning clearly and unambiguously provided in this specification.

Terminology

The terms and phrases as indicated in parenthesis (" ") in this section are intended to have the meaning ascribed to them in this section applied to them throughout this document including the claims unless clearly indicated otherwise in context.

The term "or" as used in the specifications and the appended claims is not meant to be exclusive, rather the term is inclusive meaning "either or both".

Reference in the specification to "one embodiment", "an embodiment", "a preferred embodiment", "an alternative embodiment", "embodiments", "variations", and similar phrases mean that a particular feature, structure, and characteristic described in connection with the embodiment(s) or variation(s) is included in at least an embodiment or variation of the invention. The appearance of the phrase "in one embodiment" or "in one variation" in various places in the specification are not necessarily all referring to the same embodiment or variation.

The term "spin", "rotate", "connected", "joined", "welded", "vertical", "attached", or "mounted" as used in the specification and the appended claims referred to either an indirect or direct connection between the identified elements, components or objects. Often the manner of the coupling will be related specifically to the manner in which the two coupled elements interact.

The phrases "partial shield", "semicircle", "vertical axis", "mounting method", "inside the hood" and "above the hood" and similar phrases refer to turbine operating and charging methods respectively wherein the turbine is in an upright standing position. The "upright standing position" is the most common and well known way a typical vertical axis wind turbine operates at. This type of turbine and accordingly the phrases as used herein does not deviate from that commonly held meaning. In contrast, a "blade open facing the wind", "blade not open facing the wind", is one in which the blades open facing the viewer or the wind is the blade open facing the wind, while the blades not open facing the viewer or the wind is the blade not open facing the wind or the blade which shield from the wind.

There are hundreds of components associated with the shield, the vertical axis wind turbine and the vehicle industry that are so commonly known as to be turbine and car parts therefore are excluded from the description herein. Items such as blade details, vehicle detail, welded details, bearing details, nuts, bolts, washers and the like. Those individuals with ordinary skills in the art, with the benefit of this disclosure can, from the descriptions and diagrams provided herein easily and obviously understand and determine exactly what is required to manufacture, assembly or buy items not shown.

An Embodiment of a Unique Vertical Axis Wind Turbine with Improved Blade Design:

An embodiment of a proper method to attach vertical axis wind turbines to electric vehicles and charge the vehicle while driving is illustrated all or in part in FIGS. 1-13. Referring primarily to FIG. 1), line 20 is just the opening on the grill section of the hood for air intake for the system, line 21 is just the vertical axis wind turbine and where it is positioned inside the hood, line 22 is the opening on the top of the hood for the wind to exit through the top.

Referring primarily In FIG. 2), line 20 is just the opening on the grill section of the hood for air intake for the system, line 21 is just the vertical axis wind turbine and where and how it is positioned inside the hood, line 22 is the opening on the top of the hood for the wind to exit through the top.

Referring primarily in FIG. 3), line 20 is just the opening on the grill section of the hood for air intake for the system on a different vehicle, line 21 is just the vertical axis wind turbine and where it is positioned inside the hood on a different vehicle and line 22 is the opening on the top of the hood for the wind to exit through the top on a different vehicle.

Referring primarily in FIG. 4), line 21 is just the same vertical axis turbine and where and how the turbine is positioned when operating above the hood and line 23 is the partial shield for the turbine when the turbine is operating above the hood of the vehicle and how the shield is positioned in front of the turbine.

Referring primarily In FIG. 5), line 21 is just the close in top view of the same vertical axis turbine and how it is positioned next to the partial when the turbine is operating above the hood and line 23 is the close in view of the partial shield and how it is positioned in front of the turbine when the turbine is operating above the hood. Referring Primarily In FIG. 6), line 21 is just the same vertical axis wind turbine and where and how the turbine is positioned when operating above the hood and line 24 is the close in view of a different partial shield and how it is positioned in front of the turbine when the turbine is operating above the hood.

Referring Primary In FIG. 7), line 21 is just the same vertical axis wind turbine and where and how the turbine is positioned when operating above the hood and line 24 is a different partial shield for the turbine when the turbine is operating above the hood of the vehicle and how the shield is positioned in front of the turbine.

Referring Primary In FIG. 8), line 21 is just the same vertical axis wind turbine and where and how the turbine is positioned when operating in front of the hood of the vehicle, line 26 is the tube housing for the turbine when the turbine is operating in front of the vehicle and line 27 is the partial shield for the turbine and how the shield positioned in front of the turbine when the turbine is operating in front of the vehicles.

Referring Primary In FIG. 9), line 21 is just the close in view of the vertical axis wind turbine consisting of a circle, a cross and a open triangle attached to the cross, line 26 is just the top view of the housing tube which is shown a circle and line 27 is just the top view of the partial shield shown as a semicircle when the wind turbine is operating in front of the vehicle.

Referring Primary In FIG. 10), line 21 is the close in front view of the vertical axis wind turbine, line 26 is the close in front view of the housing tube and line 27 is the close in front view of the partial shield when the wind turbine is attached to the front of the vehicle.

Referring Primary In FIG. 11), line 20 is the top view of the line opening on the grill section of the hood for air intake for the system, line 21 is top view of the vertical axis wind turbine on a vehicle and line 22 is the top view of the opening on the top of the hood for the wind to exit through the top when the wind turbine is operating inside the hood.

Referring Primary In FIG. 12), line 21 is the top view of the vertical axis wind turbine on a vehicle and line 23 is the top view of partial shield on a vehicle when the wind turbine is operating above the hood.

Referring Primary In FIG. 13), line 21 is the top view of the vertical axis wind turbine on a vehicle and line 24 is the top view of a different partial shield on a vehicle when the wind turbine is operating above the hood.

The invention claim is:

1. A vertical axis wind turbine system (VAWTS) for a transportation vehicle comprising:
   at least one vertical axis wind turbine including a shaft that extends in the vertical direction and a plurality of blades coupled to the shaft;
   a shield, positioned upstream of the at least one vertical axis wind turbine, including a height greater than or equal to a height of the plurality of blades;
   wherein the shield partially overlaps the at least one vertical axis wind turbine in a horizontal direction such that only open facing blades of the plurality of blades are exposed to a wind;
   the at least one vertical axis wind turbine and the shield are mounted to the transportation vehicle so as to operate above, in front of, or inside of the transportation vehicle;
   wherein, when mounted above the transportation vehicle, only a bottom edge of the shield is not exposed to the wind; and
   wherein, when mounted inside of the transportation vehicle, a tunnel channels the wind from an air intake to the at least one vertical axis wind turbine, the shield is defined by a tunnel wall that extends from the air intake to a housing section for the at least one vertical axis wind turbine, the tunnel extends at an angle from the housing section, in an upward direction, to an air exit such that the air exit is higher than a top of the at least one vertical axis wind turbine.

2. The vertical axis wind turbine system of claim 1, wherein the at least one vertical axis wind turbine and the shield are mounted above the transportation vehicle, and only a portion of the at least one vertical axis wind turbine, having the plurality of blades, and the shield are outside of the transportation vehicle.

3. The vertical axis wind turbine system of claim 1, wherein the at least one vertical axis wind turbine and the shield are mounted in front of the transportation vehicle, and a housing attached to the front of the transportation vehicle, for the at least one vertical axis wind turbine and shield, has only a portion of the at least one vertical axis wind turbine, without the plurality of blades, located inside of the housing.

4. The vertical axis wind turbine system of claim 3, wherein the housing is a tube.

5. The vertical axis wind turbine system of claim 1, wherein the at least one vertical axis wind turbine and the shield are mounted inside of the transportation vehicle.

\* \* \* \* \*